(12) United States Patent
Ku et al.

(10) Patent No.: US 6,851,064 B2
(45) Date of Patent: Feb. 1, 2005

(54) FINE-GRAINED THERMAL CONTROL IN MEMORY SUBSYSTEMS

(75) Inventors: Joseph Weiyeh Ku, Palo Alto, CA (US); Chandrakant D. Patel, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 660 days.

(21) Appl. No.: 09/934,615

(22) Filed: Aug. 22, 2001

(65) Prior Publication Data

US 2003/0041289 A1 Feb. 27, 2003

(51) Int. Cl.[7] .................................................. G06F 1/20
(52) U.S. Cl. ........................ 713/300; 318/268; 361/687; 361/688; 361/695; 702/99; 702/130; 702/132
(58) Field of Search ............................ 713/300; 702/99, 702/130, 132; 361/687, 688, 695; 318/268

(56) References Cited

U.S. PATENT DOCUMENTS

| | | | | |
|---|---|---|---|---|
| 5,243,637 A | | 9/1993 | Flaherty et al. | |
| 5,774,704 A | * | 6/1998 | Williams | 713/501 |
| 5,961,577 A | | 10/1999 | Soenen et al. | |
| 5,963,887 A | * | 10/1999 | Giorgio | 702/64 |
| 6,021,076 A | * | 2/2000 | Woo et al. | 365/211 |
| 6,134,667 A | * | 10/2000 | Suzuki et al. | 713/300 |
| 6,454,362 B1 | * | 9/2002 | Katsui et al. | 301/117 |
| 6,470,289 B1 | * | 10/2002 | Peters et al. | 702/132 |
| 6,494,381 B2 | * | 12/2002 | Bulthuis | 236/49.3 |
| 6,636,910 B2 | * | 10/2003 | Kung et al. | 710/60 |
| 6,643,128 B2 | * | 11/2003 | Chu et al. | 361/687 |
| 6,654,894 B2 | * | 11/2003 | Kaminski et al. | 713/300 |
| 6,760,649 B2 | * | 7/2004 | Cohen | 700/299 |
| 6,777,900 B2 | * | 8/2004 | Lee | 318/268 |

* cited by examiner

Primary Examiner—A. Elamin

(57) ABSTRACT

An apparatus and method for monitoring memory system performance and controlling an operating parameter is provided. A plurality of digital events indicative of memory system operations is detected, from which a subset of digital events to count is periodically selected, the subset being those digital events occurring during a sampling window time interval. Responsive to each digital event of the subset, a transistor is switched on to conduct current from a power supply to a capacitor. The transistor is biased by the capacitor to operate in a constant current region providing a substantially fixed amount of charge added to the capacitor responsive to each digital event of the subset. The operating parameter is controlled responsive to the charge accumulated in the capacitor, representative of the count of digital events in the subset. In one embodiment, the sampling window time interval is selected pseudo-randomly within a periodic base time interval.

31 Claims, 2 Drawing Sheets

FINE-GRAINED THERMAL CONTROL IN MEMORY SUBSYSTEMS

CROSS-REFERENCE TO RELATED APPLICATIONS

This application is related to co-pending application Ser. No. 09/935,021 entitled "Analog Method and Circuit for Monitoring Digital Events Performance" by Joseph Weiyeh Ku, and co-pending application Ser. No. 09/934,191 entitled "Digital Event Sampling Circuit and Method" by Joseph Weiyeh Ku, both filed in the United States Patent and Trademark Office on the same date as the present application. The above-mentioned related applications are incorporated by reference into this present application.

FIELD OF THE INVENTION

The present invention generally relates to electronic system performance monitoring and control, and more particularly, to controlling memory system cooling.

BACKGROUND OF THE INVENTION

A computer system, including single-board and single-chip computer systems, generally include a central processing unit ("CPU") main board for manipulating data, a memory controller and a memory subsystem for storing data. A memory controller interfaces the CPU and memory, managing data transfer and retrieval therebetween. Generally, data is retrieved from memory for processing by the CPU and returned to memory when not being actively processed. Memory references from the memory controller to the memory subsystem often requires significant power (i.e., heat) to be dissipated in the CPU main board.

When the CPU needs data retrieved from memory, the CPU sends out a memory request to the memory controller. The memory controller generates an address to access the memory subsystem (e.g., the memory boards such as DIMM or other types) and retrieve the data. The appropriate address is typically communicated to the memory via an address bus, and the data is typically transferred to/from the memory via a data bus. Once the data is retrieved from the memory, the memory controller relays the requested data back to the CPU for processing.

Accessing memory entails several different specific tasks, each task using differing levels of power, and thus generating differing quantities of heat. One example of an acute heat-generating task is the memory controller issuing an "Active" state (i.e., combination of RAS/CAS/WE signals) resulting in an SDRAM chip opening a page which consumes significant power on a memory core area. Another example memory system operation that generates significant heat is the memory controller issuing a "Read/Write" mode. Depending on the particular data and its burst rate, I/O bus activity increases dramatically between the memory controller and the memory, typically reaching peak levels of power (i.e., heat) dissipation during the operation.

Large quantities of data are routinely transferred to and from computer memory; however, data transfer is typically not uniform over time. Periods of intense data transfer to/from memory are separated by periods of minimal data transfer. Large numbers of memory operations generate measurable heat. Therefore, heat-generation is not uniform over time. Heat generated by digital system operations increases memory and computer system temperature, with excessive heat having a potentially adverse effect on system performance. It is therefore desirable to timely remove heat from computer and memory systems.

In one conventional computer system cooling method, cooling mechanisms such as fans or air conditioning apparatus are responsive to measured temperature changes. A computer system generates operating heat that warms system components and surrounding air until temperature is detected outside an acceptable limit. Heat is subsequently removed by dispatching cooling mechanisms until system temperature is restored to within acceptable limits. This remedial-type cooling cycle is repeated as necessary. Generally, some delay time period elapses between the occurrence of the system activity that generates the heat, detection of the heat and onset of cooling operations to remove the heat. System components are exposed to elevated temperatures during the delay time period prior to cooling operations, as well as during the time necessary to remove the heat. Optionally, cooling apparatus is continuously operated. Cooling mechanisms use energy, create noise and require maintenance, generally proportional to operating time. Cooling mechanisms operated continually in response to cyclic heat generation is inefficient, increasing operating and maintenance costs, as well as system noise levels. These conventional cooling methods provide rather coarse system thermal control.

A method and arrangement, responsive to digital systems performance monitoring, for fine-grain thermal control of electronic systems, particularly memory subsystems, that address the aforementioned problems, as well as other related problems, are therefore desirable.

SUMMARY OF THE INVENTION

According to one aspect of the present invention, a method for monitoring electronic system performance and controlling an operating parameter is provided. A plurality of digital events, indicative of electronic system operations, is detected and a subset of digital events is periodically selected to count, the subset being those digital events occurring during a sampling window time interval. Responsive to each digital event of the counted subset, a transistor is switched on to conduct current from a constant current source power supply to a capacitor. A substantially fixed amount of charge from a constant current source is thereby added to the capacitor responsive to each digital event. The transistor is biased by the capacitor to operate in a constant current region. The operating parameter is controlled responsive to the charge accumulated in the capacitor, representative of the count of digital events in the subset. In one embodiment, initiation of the sampling window time interval is selected pseudo-randomly within a periodic base time interval to economically approximate statistical sampling techniques.

According to another aspect of the present invention, there is provided a memory system and a method for cooling the memory system responsive to digital performance monitoring. The memory system includes an electronic memory arrangement having a cooling arrangement, a memory controller, and a bus communicatively coupled between the memory controller and electronic memory arrangement. The bus conducts a logic signal. A performance monitoring circuit arrangement portion of the memory controller, including a detection circuit, is communicatively coupled to the bus and arranged to detect digital events derived from the bus logic signal. Coupled to the detection circuit, a sampling circuit is arranged to select a subset of the digital events. A counting circuit is coupled to the sampling circuit and adapted to accumulate a count of digital events in the subset. A control management circuit is coupled between the memory controller and a driver circuit, the control management circuit being adapted to communicate control signals to the driver circuit responsive to the counting circuit. The driver circuit is adapted to control the cooling arrangement responsive to the control signals.

BRIEF DESCRIPTION OF THE DRAWINGS

The invention may be more completely understood in consideration of the following detailed description of various embodiments of the invention in connection with the accompanying drawings, in which.

Figure 1:
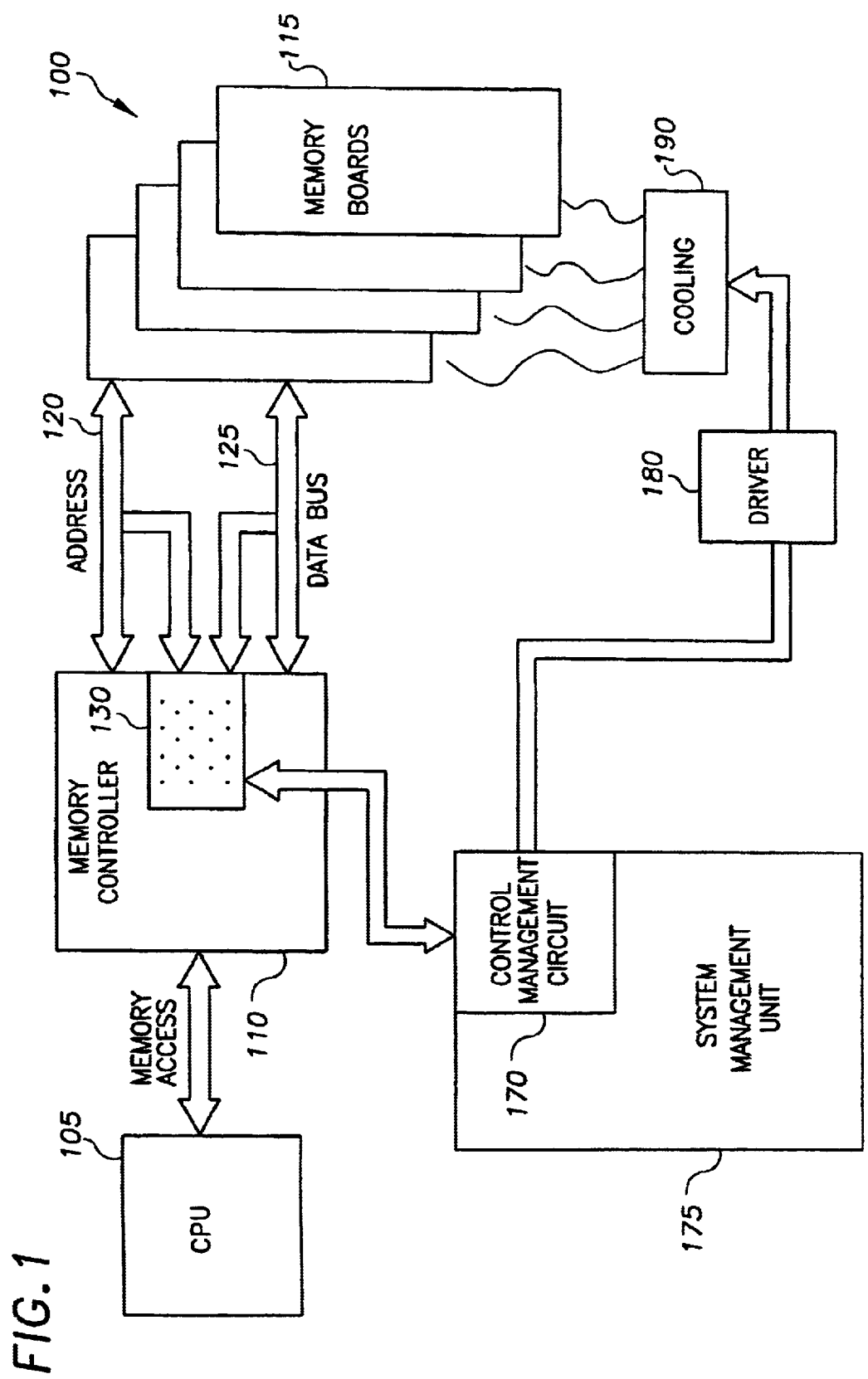
FIG. 1 is a block diagram of one example embodiment of an electronic system having a cooling arrangement in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

During computer operations, a central processing unit ("CPU") makes a memory request to a memory controller to retrieve or store data. In turn, the memory controller communicates a memory reference to an electronic memory arrangement (e.g., DIMM module) via address and data buses coupling the memory controller and the memory arrangement. The memory reference from the memory controller to the memory arrangement is indicative of memory arrangement operations associated with significant power dissipation for the CPU main board. The power is dissipated as heat.

Conventionally, a thermal probe in the system enclosure is used to sense temperature changes caused by heat released during memory arrangement operations and regulate an electric fan to remove the heat. A conventional thermal control scheme, responsive to temperature alone, is coarse and inefficient. Rather than wait for measurable system temperature changes to initiate cooling operations, the present invention supports a much finer-grained cooling control scheme by extracting memory reference information indicative of future heat-generating operations.

A method and arrangement for fine-grain control of an electronic system having a controllable operating parameter is provided. The operating parameter is responsive to a digital systems performance monitoring circuit arrangement. The present invention is believed to be applicable to control operating parameters of electronic systems, including computer systems and memory subsystems. Controllable operating parameters include, but are not limited to, cooling rate/duration, clock frequency (e.g., processing speed), power management, voltage level selection and the like.

One method of monitoring electronic system performance is to count a quantity of digital event occurrences, or more particularly, to count a quantity of event occurrences within a finite period of time (i.e., rate). Optionally, the quantity counted is compared to a threshold quantity, or threshold rate, as a basis for determining a course of action. Counting digital events has conventionally been accomplished using digital binary counter circuits. An advantage of using binary counters is the ability to count digital events precisely. However, using digital counters to obtain a precise count of all digital events also has significant disadvantages. As clock speeds continue to increase, the rate (i.e., quantity of digital events occurring within the fixed time period) also continue to increase. This increase in the quantity of digital events to be counted quickly consumes binary counter capacity. Increasing binary counter capacity commensurate with increased clock speed requires more overhead circuitry such as long scan chain to improve the testability of the counter. The complexity of larger binary counters, and the accompanying circuitry necessary to interconnect larger binary counters to other performance monitoring logic, increases costs and occupies larger areas of valuable integrated circuit space.

In many digital event performance evaluation applications, a precise digital event count is not necessary. Often, an approximate count is adequate, for example, in regulating system chip power or dispatching chip cooling mechanisms. An approximate digital event count is appropriate where the monitored performance indicia occur in very large quantities with substantial fluctuations, where the operating parameter cannot be controlled within the precision of the count, and where a perfectly precise measure is not worth the cost to obtain the measure.

Even greater efficiency is achieved by using statistical analysis to measure a subset of the indicia. Accurate statistical information is obtained by measuring random samples of a population, then extrapolating the results to infer the behavior of the entire population. By using well-known statistical methods, the degree of various types of error introduced through the statistical sampling (rather than counting the entire population), can be controlled within acceptable limits. Whenever inferences are based on sampled data (i.e., on a less than complete look at a population), they may contain error. Errors are introduced when the selected sample is not representative of the entire population. Selecting random samples across the population mitigates the effects associated with any particular selected sample.

Energy efficiency and thermal control in electronic systems, such as computer or memory systems, are important design and operating concerns. The method of the present invention is believed to be particularly applicable to thermal control of an electronic system. While the present invention is not necessarily limited to controlling a memory system cooling arrangement, various aspects of the invention may be appreciated through a discussion of various examples using this context.

An electronic system has a cooling arrangement adapted to cool the electronic system. Signal path logic signals, indicative of heat-generating operations, are monitored. A plurality of digital events derived from the logic signals is detected. A subset of the digital events is selected by periodic sampling, for example, those digital events occurring during a sampling window time interval. A count of the digital events comprising the subset is accumulated in a counting circuit, and the cooling arrangement is controlled responsive to the counting circuit. The cooling arrangement is adapted to regulate electronic system cooling responsive changes in system heat-generating activity rather than changes in temperature. For example, additional cooling is provided responsive to high heat-generating system activity by lengthening the operating duration of a cooling arrangement, or increasing the rate of heat removal.

System performance information, such as references to a memory arrangement, is extracted by monitoring information passed to and from the memory arrangement on address and data buses as a logic data signals. Certain digital events, such as memory address and data bus logic signal transitions, are detected. Each digital event is predictive of a memory arrangement operation that dissipates a quantity of heat. However, the quantities of digital events of interest are rather large, and in aggregate, are predictive of significant thermal activity. Digital event information is used to generate control signals to regulate a cooling arrangement adapted to cool the memory arrangement, for example, cool particular memory system boards. Cooling arrangement control parameters include, for example, controlling the quantity of operating electric fans, the speed of electric fans, or air conditioning compressor power, etc. Additionally, or alternatively, the duration of cooling operations is regulated to provide differing amounts of cooling. In other embodiments of the present invention, other electronic variable operating parameters are controlled, including power and clock frequency, responsive to digital event performance monitoring.

The apparatus and method of the present invention is capable of responding more closely with the sources of heat generation to mitigate the magnitude of system temperature excursions. Semiconductor memory chip reliability is improved without the inefficiencies associated with continuous cooling operations. Measuring smaller units of heat generation than degrees of system temperature change, also permits dispatching the cooling arrangement in finer stages, thereby improving memory system power usage.

In one example embodiment of the present invention, the counting circuit is a binary counter. In another embodiment of the present invention, the counting circuit is a capacitor coupled to a constant current source through a switching circuit. A substantially fixed amount of charge is added to the capacitor responsive to each digital event in the subset, the charge being controlled by the switching circuit. The switching circuit is a portion of the constant current source in one example embodiment, and independent from the constant current source in another example embodiment. In a further example embodiment, the switching circuit is a transistor. In yet another example embodiment, the transistor, biased by the capacitor to operate in a constant current region, is switched to conduct current from a power supply to the capacitor.

In a further example embodiment, the sampling window time interval has a fixed duration and is a within a periodic base time interval, also having a fixed duration. In a still further embodiment of the present invention, the sampling window time interval is selected to begin at a pseudo-random time within the periodic base time interval. Optionally, the counting circuit has a threshold, and provides an output signal responsive to the count of digital events in the subset that is accumulated with respect to the threshold. The threshold is optionally variable, selectable, and programmable in further example embodiments of the present invention.

In accordance with another example embodiment of the present invention, an electronic system having a controllable operating parameter includes a performance monitoring circuit for detecting a plurality of digital events indicative of electronic system operations. The performance monitoring circuit is adapted to select a subset of digital events occurring within a sampling window time interval. Responsive to each digital event of the subset, a transistor is switched to conduct current from a power supply to a capacitor, the transistor being biased to operate in a constant current region to add a substantially fixed amount of charge to the capacitor. The substantially fixed amounts of charge are accumulated in the capacitor representative of a count of digital events in the subset. The operating parameter is controlled responsive to the charge accumulated in the capacitor.

In a further example embodiment, the performance monitoring circuit includes a circuit portion adapted to select the initiation of the sampling window time interval at a pseudo-random time within the base time interval. The base time interval is a periodic time interval having a fixed duration and period. The sampling window time interval has a fixed duration, but is initiated at a variable time within the base time interval.

In another example embodiment of the present invention, an electronic system has a cooling arrangement. A signal path is disposed within the electronic system, the signal path conducting a logic signal. A detection circuit is communicatively coupled to the signal path and arranged to detect digital events derived from the logic signal. Coupled to the detection circuit, a sampling circuit is arranged to select a subset of the digital events. A counting circuit coupled to the sampling circuit is adapted to accumulate a count of the digital events in the subset and a control circuit coupled between the counting and the cooling arrangement regulates the cooling arrangement responsive to the accumulated count of digital events in the subset. The counting circuit is a binary counter in one example embodiment, and a constant current source coupled to a capacitor through a switching transistor in another example embodiment. The sampling circuit is arranged to pseudo-randomly select the subset of digital events during a periodic base time interval, the base time interval being a fixed duration.

In a further example embodiment of the present invention, the electronic system includes a memory arrangement and a memory controller. The signal path is a bus communicatively coupling the memory arrangement to the memory controller. In a still further example embodiment, the electronic system includes a central processing unit ("CPU") and optionally, peripheral devices supporting CPU data input and output operations.

FIG. 1 is a block diagram illustrating one example embodiment of the present invention. A computer system board 100 is provided having a memory controller 110 including an address and data bus activity monitor circuit. A central processing unit ("CPU") 105 is communicatively coupled to memory controller 110 and communicates memory access requests to memory controller 110 for data necessary in processing or storage. Memory controller 110 is communicatively coupled to an arrangement of memory boards 115 by an address bus 120 and a data bus 125. Memory controller 110 includes a performance monitoring circuit arrangement 130.

Figure 2:
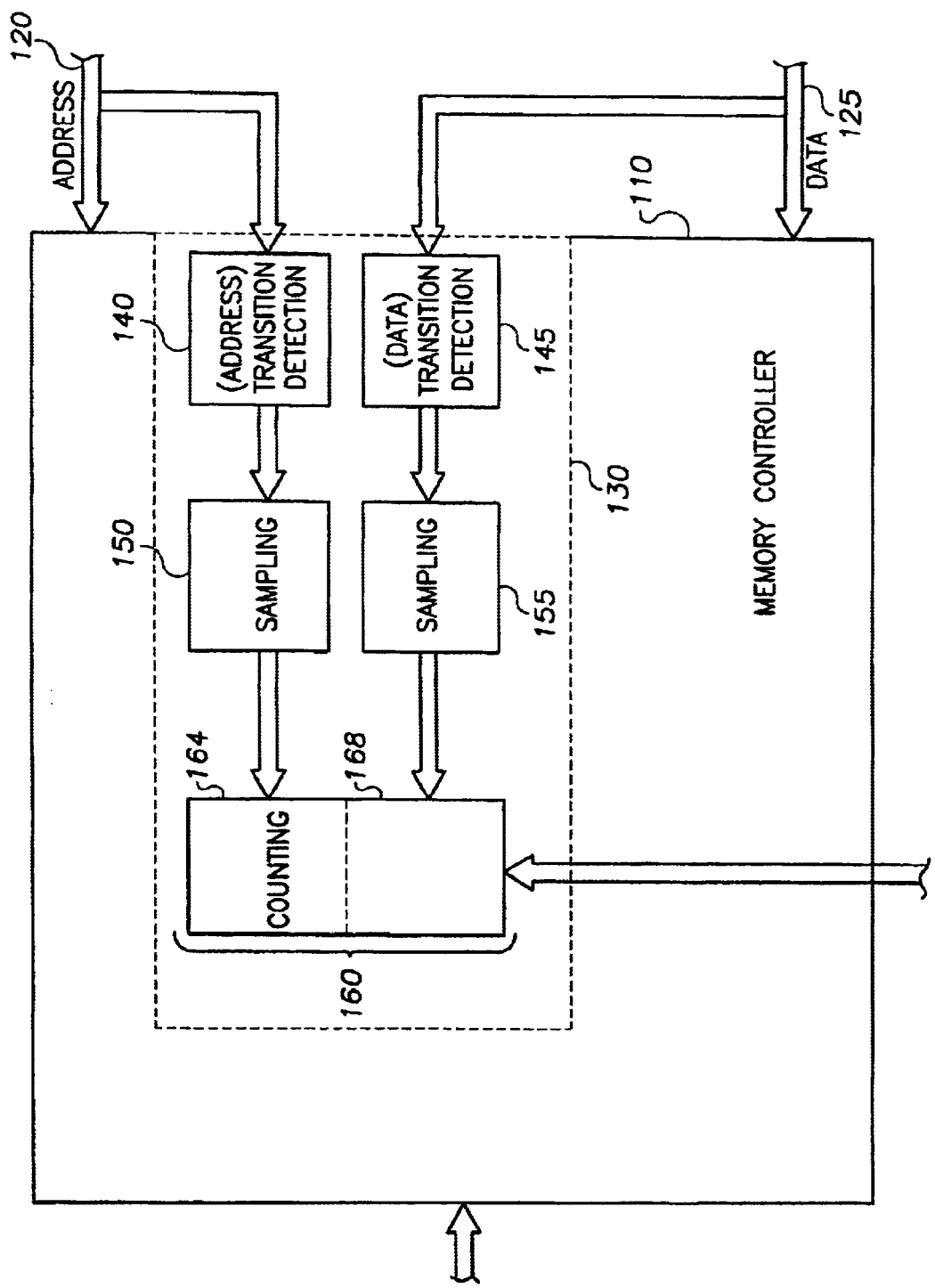
FIG. 2 is a block diagram illustrating further detail comprising a performance monitoring circuit arrangement portion of the electronic system of FIG. 1 in accordance with the present invention.

FIG. 2 is a block diagram further illustrating the detail comprising performance monitoring circuit arrangement 130. Performance monitoring circuit arrangement 130 optionally includes an address portion and a data portion. In one example embodiment of the present invention, a front-end monitor consists of two detection circuits, an address detection circuit 140 and a data detection circuit 145, each detection circuit adapted to detect logic signal transitions. Address transition detection circuit 140 is communicatively coupled to address bus 120, and to a sampling circuit 150. Sampling circuit 150 is further coupled to a counting circuit 160. Data detection circuit 145 is communicatively coupled to data bus 125, and to a sampling circuit 155. Sampling circuit 155 is further coupled to a counting circuit 160. Counting circuit 160 optionally has an address portion 164 and a data portion 168, address portion 164 being coupled to sampling circuit 150, and data portion 168 being coupled to sampling circuit 155.

Address detection circuit 140 and data detection circuit 145 respectively generate a single digital event pulse per logic signal transition detected, address detection circuit 140 generating a digital event pulse for transitions detected on address bus 120 and data detection circuit 145 generating a digital event pulse for transitions detected on data bus 125. Data bus 125 is either bi-directional or unidirectional and although represented in FIG. 1 as a single data detection circuit 145, both "DIN" and "DOUT" data ports are monitored for transition detection. In one embodiment, each of the "DIN" and "DOUT" ports are monitored by a separate transition detection circuit. Representative of a series of address and data transitions on the respective buses, a logic signal comprising a plurality of digital event pulses ("digital events") is generated by the transition detection circuits over time.

Sampling circuits 150 and 155 respectively, generate a base time interval and sampling window time interval, and optionally sample the plurality of digital events as is described further in co-pending U.S. Patent Application entitled, "Digital Event Sampling Circuit and Method," by Joseph Weiyeh Ku, docket number 10013826-1 (attorney docket number HPCO.077PA), and incorporated herein by reference. The base time interval is a periodic time interval having a fixed duration and period. The sampling window time interval also has a fixed duration and occurs within the base time interval duration in one example embodiment. In a further example embodiment, sampling window time interval is selected to occur at a pseudo-random time within the base time interval. Sampling window time interval does not extend outside the base time interval.

The digital events occurring during the sample window time interval is a subset of the digital events occurring during the base time interval. In one embodiment, the base time interval is 1 second, and the sampling window time interval is 1 millisecond; however, the durations of both time intervals are design variables particular to the specific application of the present invention and the determination of these variables is within knowledge of one skilled in the relevant art. The sampling window time interval is optionally selected to start at a pseudo-random time within the base time interval as further described in the above-mentioned co-pending U.S. patent application.

In one example embodiment of the present invention, a count of digital events occurring during the sample window interval is accumulated in counting circuit 160, the sample window time interval being equivalent and concurrent with the base time interval. In another example embodiment of the present invention, a count of digital events occurring during the sample window time period is accumulated in counting circuit 160, the sample window time interval being shorter in duration than the base time interval. Implementations of counting circuit 160 include digital counters, binary counters, analog counters, and other count mechanisms. More particular example embodiments of counting circuit 160 are set forth in co-pending U.S. patent application entitled, "Analog Method and Circuit for Monitoring Digital Events Performance," by Joseph Weiyeh Ku, docket number 10013825-1 (attorney docket number HPCO.076PA), herein incorporated by reference.

Upon accumulating a count of digital events to a pre-determined threshold, counting circuit 160 generates an output signal. Optionally, counting circuit 160 independently accumulates a count of address digital events in the address portion 164, and data digital events in the data portion 168, in the manner described above. Each of address portion and data portion generates an independent output signal dependent on each portion's accumulated digital event count and threshold setting. A count of digital events is accumulated during each sampling window time interval in one example embodiment of the present invention. In a further embodiment, the count is reset and begun anew for each sampling window time interval. In another further example embodiment, the count of digital events continues cumulatively between sampling window time intervals, without reset, until a threshold is reached.

Referring again to FIG. 1, performance monitoring circuit arrangement 130 is further communicatively coupled to a control management circuit 170. In a more particular example embodiment, counting circuit 160 is communicatively coupled to control management circuit 170, as illustrated in FIG. 2. In a further example embodiment, each of the address 164 and data 168 portions of counting circuit are each communicatively coupled to control management circuit 170. In one example embodiment, control management circuit 170 is a power level control management circuit. Optionally, control management circuit 170 is a component of a higher-level system management unit, for example, a computer system power management unit (PMU), and is part of an overall PMU scheme (i.e., method).

In one example embodiment, counting circuit 160 communicates a signal to control management circuit 170 representative of an accumulated count. In another example embodiment, counting circuit 160 communicates an output signal to control management circuit 170 representative of the accumulated count in relation to a count threshold. In a further example embodiment of the present invention, counting circuit 160 generates and communicates various output signals to control management circuit 170 responsive to a plurality of count thresholds, for example, counting circuit 160 is implemented with a programmable voltage divider to provide a plurality of selectable thresholds in one example embodiment and counting circuit 160 communicates an output signal to control management circuit 170 with respect to each threshold. In another example embodiment, a lookup table is used to dynamically select a programmable voltage divider configuration within counting circuit 160. The output signal(s) from counting circuit 160, initiate some pre-determined action by control management circuit 170, for example, a decision making process followed by some further action. In one example embodiment, control management circuit 170 uses a lookup table to determining which appropriate control signals to generate responsive to the output signal received from counting circuit 160.

As illustrated in FIG. 1, control management circuit 170 is coupled to driver circuit 180, and driver circuit 180 is further coupled to a control mechanism, for example, cooling arrangement 190. Control management circuit 170 provides control signals to driver circuit 180, for example, to slow down a fan speed during a memory idle mode or to start additional fans during periods of heavy memory activity. Control management circuit 170 generate digital control signals in one example embodiment of the present invention. In a further example embodiment of the present invention, driver circuit 180 is a digital-to-analog converter, adapted to drive cooling arrangement 190 responsive to control signals received from control management circuit 170.

Table 1 below illustrates one example embodiment of cooling level control. Other example embodiments implement similar logic for other process variables such as power level control, voltage level control and processor speed (i.e., clock frequency) control.

TABLE 1

| Address Change? | Data Change? | Cooling Level | Remarks |
| --- | --- | --- | --- |
| Yes | <1K counts | 1 | <5% Total Bus Bandwidth |
| Yes | >1K & <10K | 2 | |
| Yes | | 3 | |
| Yes | | 4 | |
| Yes | | 5 | |
| Yes | | 6 | |
| Yes | | 7 | |
| Yes | >1 million counts | 8 | >90% Total Bus Bandwidth |

Effective cooling level control considers both address bus and data bus activities, since these indicators operate together in determining which heat-generating operations are occurring. Either one may be monitored alone in embodiments of the present invention, but provides less predictive value. For example, data bus change does not necessarily accompany memory address changes.

Accordingly, the present invention is not to be necessarily limited to the particular examples described above, but is intended to cover all aspects of the invention as fairly set out in the attached claims. For instance, while a method and apparatus to control a cooling arrangement responsive to memory system bus performance monitoring are illustrated, other electronic systems, including computer systems, can benefit from the above-mentioned teachings. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A method for cooling an electronic system, comprising:
   detecting a plurality of digital events indicative of electronic system operations and heat generated during the operations;
   accumulating a count of a subset of the plurality of digital events in a counting circuit, the subset of digital events occurring within a sampling window time interval; and
   controlling a cooling arrangement responsive to the counting circuit, wherein the cooling arrangement is adapted to cool the electronic system.

2. The method of claim 1, wherein the counting circuit is a binary counter.

3. The method of claim 1, wherein the counting circuit is a capacitor and further comprising adding a substantially fixed amount of charge to the capacitor responsive to each digital event in the subset.

4. The method of claim 3, further comprising switching a transistor on to conduct current from a constant current source to the capacitor responsive to each digital event in the subset.

5. The method of claim 4, wherein the transistor is biased to operate in a constant current region by the capacitor.

6. The method of claim 5, wherein the sampling window time interval has a fixed duration and is within a base time interval, the base time interval being a periodic time interval having a fixed duration and period.

7. The method of claim 6, further comprising selecting the sampling window time interval at a pseudo-random time within the base time interval.

8. The method of claim 1, wherein the counting circuit has a threshold and further comprising providing a counting circuit output signal responsive to the count of digital events in the subset accumulated and the threshold, the cooling arrangement responsive to the output signal.

9. The method of claim 8, wherein the threshold is variable.

10. The method of claim 9, wherein the threshold is selectable.

11. The method of claim 10, wherein the threshold is programmable.

12. The method of claim 1, further comprising regulating the cooling arrangement to provide more electronic system cooling in proportion to the count of digital events in the subset accumulated in the counting circuit.

13. The method of claim 1, further comprising monitoring an electronic system bus logic signal wherein a digital event is a logic signal transition.

14. The method of claim 13, wherein the electronic system bus is a data bus.

15. The method of claim 13, wherein the electronic system bus is an address bus.

16. A method for monitoring an electronic system and controlling an operating parameter, comprising:
   detecting a plurality of digital events indicative of electronic system operations;
   selecting a subset of the plurality of digital events, the subset of digital events occurring within a sampling window time interval;
   switching a transistor on responsive to each digital event of the subset to conduct current from a constant current source to a capacitor, the transistor being biased to operate in a constant current region;
   adding a substantially fixed amount of charge to the capacitor responsive to each digital event of the subset;
   accumulating a charge in the capacitor representative of a count of digital events in the subset; and
   controlling the operating parameter responsive to the charge accumulated in the capacitor.

17. The method of claim 16, further comprising biasing the transistor with the capacitor to operate in a constant current region.

18. The method of claim 17, wherein the sampling window time interval has a fixed duration within a base time interval and the base time interval is a periodic time interval having a fixed duration and period.

19. The method of claim 18, further comprising selecting the sampling window time interval at a pseudo-random time within the base time within the base time interval.

20. An electronic system, comprising:
   means for detecting a plurality of digital events indicative of electronic system operations and heat generated during the operations;
   means for accumulating a count of a subset of the plurality of digital events in a counting circuit, the subset of digital events occurring within a sampling window time interval; and
   means for controlling a cooling arrangement responsive to the counting circuit, wherein the cooling arrangement is adapted to cool the electronic system.

21. An electronic system having an controllable operating parameter, comprising:
   means for detecting a plurality of digital events indicative of electronic system operations;
   means for selecting a subset of the plurality of digital events, the subset of digital events occurring within a sampling window time interval;

means for switching a transistor on responsive to each digital event of the subset to conduct current from a constant current source to a capacitor, the transistor being biased to operate in a constant current region;

means for adding a substantially fixed amount of charge to the capacitor responsive to each digital event of the subset;

means for accumulating a charge in the capacitor representative of a count of digital events in the subset; and means for controlling the operating parameter responsive to the charge accumulated in the capacitor.

22. The electronic system of claim 21, further comprising means for selecting the initiation to the sampling window time interval at a pseudo-randomly time within a base time interval, wherein the sampling window time interval has a fixed duration and the base time interval is a periodic time interval having a fixed duration and period.

23. An electronic system, comprising:

a cooling arrangement;

a signal path disposed within the electronic system, the signal path conducting a logic signal;

a detection circuit communicatively coupled to the signal path and arranged to detect digital events derived from the logic signal, a sampling circuit coupled to the sampling circuit and adapted to accumulate a count of digital events in the subset; and a counting circuit coupled to the sampling circuit and adapted to accumulate a count of digital events in the subset; and a control circuit coupled to the cooling arrangement and the counting circuit, the control circuit adapted to regulate the cooling arrangement responsive to the count of digital events in the subset accumulated.

24. The electronic system of claim 23, wherein the counting circuit is a binary counter.

25. The electronic system of claim 23, wherein the counting circuit is a constant current source coupled through a switched transistor to a capacitor.

26. The electronic system of claim 25, wherein the sampling circuit is arranged to pseudo-randomly select the subset to the digital events during a periodic base time interval having a fixed duration.

27. The electronic system of claim 23, further comprising a memory arrangement and a memory controller, wherein the signal path is a bus communicatively coupling the memory arrangement to a memory controller.

28. The electronic system of claim 27, wherein the counting circuit is a constant current source coupled through a switched transistor to a capacitor.

29. The electronic system of claim 28, wherein the sampling circuit is arranged to pseudo-randomly select a subset a subset of the digital events during a periodic base time interval having a fixed duration.

30. The electronic system of claim 29, further comprising a central processing unit ("CPU") communicatively coupled to the memory controller.

31. The electronic system of claim 30, further comprising a driver circuit coupled to the control circuit, wherein the control circuit is adapted to communicate control signals to the driver circuit responsive to the counting circuit, and the driver circuit is adapted to control the cooling arrangement responsive to the control signals.

* * * * *